United States Patent
Yamashita

(10) Patent No.: US 9,872,053 B2
(45) Date of Patent: Jan. 16, 2018

(54) TRANSMISSION OF AUDIO STREAM TOGETHER WITH VIDEO DATA

(71) Applicant: SONY CORPORATION, Tokyo (JP)

(72) Inventor: Shigeyuki Yamashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/889,019

(22) PCT Filed: May 19, 2014

(86) PCT No.: PCT/JP2014/063153
§ 371 (c)(1),
(2) Date: Nov. 4, 2015

(87) PCT Pub. No.: WO2014/192568
PCT Pub. Date: Dec. 4, 2014

(65) Prior Publication Data
US 2016/0088320 A1     Mar. 24, 2016

(30) Foreign Application Priority Data
May 30, 2013 (JP) ................. 2013-114440

(51) Int. Cl.
| | |
|---|---|
| *H04N 7/173* | (2011.01) |
| *H04N 21/2368* | (2011.01) |
| *H04N 5/60* | (2006.01) |
| *H04N 7/084* | (2006.01) |
| *H04N 21/236* | (2011.01) |
| *H04N 21/434* | (2011.01) |
| *H04N 21/4363* | (2011.01) |
| *G11B 27/30* | (2006.01) |
| *G10L 19/008* | (2013.01) |
| *H04N 21/233* | (2011.01) |

(52) U.S. Cl.
CPC ....... *H04N 21/2368* (2013.01); *G10L 19/008* (2013.01); *G11B 27/3027* (2013.01);
(Continued)

(58) Field of Classification Search
None
See application file for complete search history.

(56) References Cited

U.S. PATENT DOCUMENTS 5,808,689 A * 9/1998 Small ............... H04N 7/025
                                                     348/462
6,111,610 A * 8/2000 Faroudja .......... H04N 7/0112
                                                     348/441
(Continued)

FOREIGN PATENT DOCUMENTS

JP   4557016 B   10/2010
JP   4692576 B    6/2011
(Continued)

Primary Examiner — An Son P Huynh
(74) Attorney, Agent, or Firm — Chip Law Group

(57) ABSTRACT

The present technology relates to a signal processing apparatus, a signal processing method, a program, and a signal transmission system realizing an SDI (serial digital interface) capable of effectively transmitting an audio stream together with video data, for example, of which the frame rate is 100 Hz or 120 Hz. An audio multiplexing unit multiplexes an audio sample into a data area of horizontal lines of n2 (here, 2≤n2≤n1) rows after a first horizontal line in which the audio sample is generated, which is a predetermined data area arranged within a horizontal blanking area disposed for each horizontal line of video data in a data stream defined in a format of an SDI used for transmitting the video data, in a case where an audio is sampled at an interval of once or less for horizontal lines of n1 (here, n1≥2) rows of the video data of a predetermined frame rate. For example, the present technology can be applied to a broadcast camera.

17 Claims, 11 Drawing Sheets

(52) U.S. Cl.
CPC ............. *H04N 5/602* (2013.01); *H04N 7/084* (2013.01); *H04N 21/233* (2013.01); *H04N 21/23602* (2013.01); *H04N 21/4342* (2013.01); *H04N 21/43632* (2013.01)

(56) References Cited

U.S. PATENT DOCUMENTS

| | | | | |
|---|---|---|---|---|
| 7,756,270 | B2* | 7/2010 | Shimosato | H04L 9/12 380/43 |
| 8,289,445 | B2* | 10/2012 | Yamashita | H04N 5/232 348/423.1 |
| 8,755,410 | B2* | 6/2014 | Todo | H04N 21/2368 348/484 |
| 2009/0290634 | A1* | 11/2009 | Yamashita | H04N 21/23602 375/240.01 |
| 2009/0303385 | A1* | 12/2009 | Yamashita | H04N 7/015 348/500 |
| 2010/0007787 | A1* | 1/2010 | Yamashita | H04N 5/232 348/441 |
| 2012/0007965 | A1* | 1/2012 | Mihara | G02B 27/2264 348/54 |
| 2013/0002953 | A1* | 1/2013 | Noguchi | H04N 21/2368 348/515 |

FOREIGN PATENT DOCUMENTS

| | | | |
|---|---|---|---|
| JP | 4702402 B | 6/2011 | |
| JP | 5187134 B | 4/2013 | |

* cited by examiner

| | |
|---|---|
| EAV | EAV |
| LN | LN |
| CRC | CRC |
| AUDIO DATA PACKET ×4 (124BYTES) SAMPLING AUDIO OF 48kHz: MAXIMUM 16ch SAMPLING AUDIO OF 96kHz: 8ch | AUDIO DATA PACKET ×4 (124BYTES) SAMPLING AUDIO OF 48kHz: MAXIMUM 16ch SAMPLING AUDIO OF 96kHz: 8ch |
| | |
| SAV | SAV |

268 BYTES

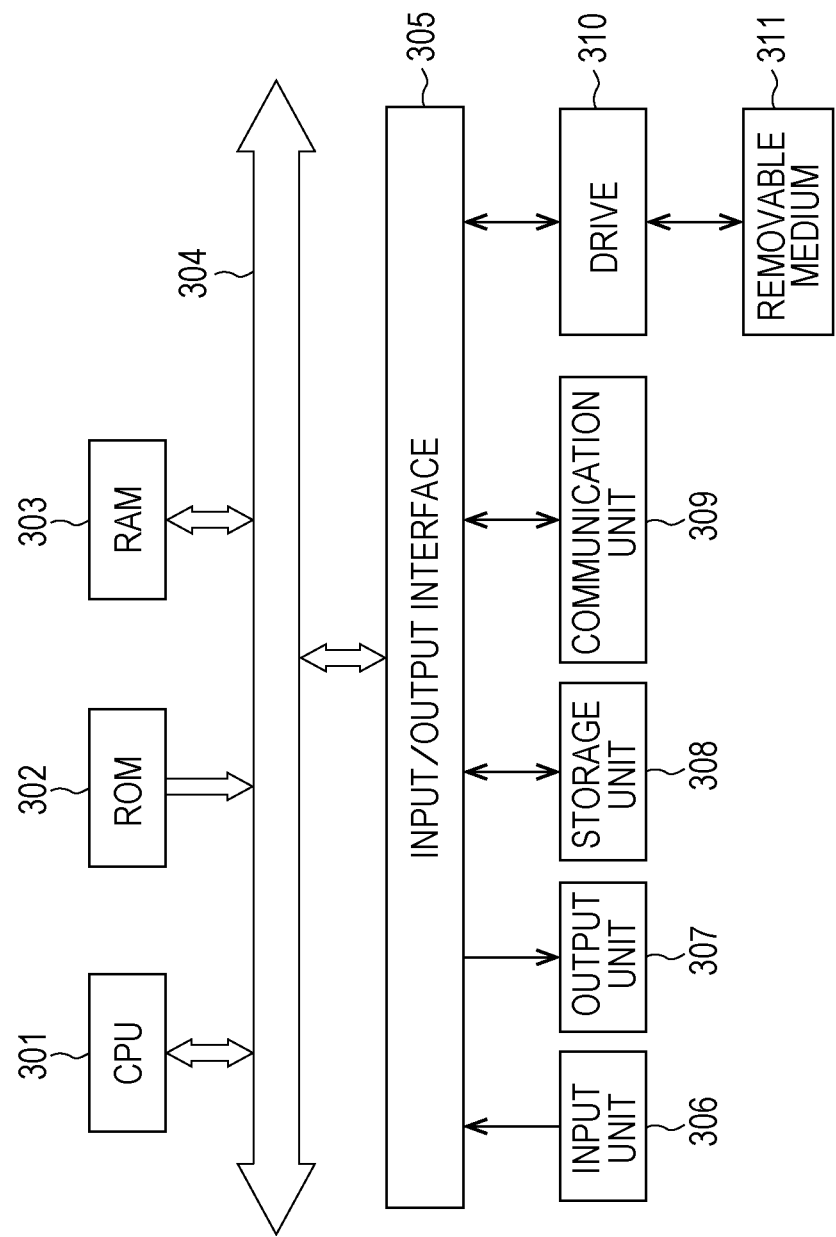

TRANSMISSION OF AUDIO STREAM TOGETHER WITH VIDEO DATA

TECHNICAL FIELD

The present technology relates to a signal processing apparatus, a signal processing method, a program, and a signal transmission system and, for example, relates to a signal processing apparatus, a signal processing method, a program, and a signal transmission system that are suitable for the use of a case where an audio stream is transmitted with being multiplexed into a data stream defined in a serial digital interface (SDI) format used for transmitting video data, of which the frame rate is in the range of 96 Hz to 120 Hz.

BACKGROUND ART

In related art, a technology for increasing the number of channels of an audio stream multiplexed into a data stream defined in level A of a 3G-SDI format has been proposed (for example, see Patent Document 1).

CITATION LIST

Patent Document

Patent Document 1: JP 4702402 B2

SUMMARY OF THE INVENTION

Problems to be Solved by the Invention

However, an SDI that is effective for video data of 120P that has already been standardized by the international telecommunication union (ITU) is not standardized. Naturally, in Patent Document 1, a method of transmitting an audio stream accompanied with video data of 120P has not been specifically proposed.

Thus, the present technology is for realizing an SDI capable of efficiently transmitting an audio stream together with video data, for example, of which the frame rate is in the range of 96 Hz to 120 Hz.

Solutions to Problems

A signal processing apparatus according to a first aspect of the present technology includes an audio multiplexing unit that multiplexes an audio sample into a data area of horizontal lines of n2 (here, $2 \leq n2 \leq n1$) rows after a first horizontal line in which the audio sample is generated, which is a predetermined data area arranged within a horizontal blanking area disposed for each horizontal line of video data in a data stream defined in a format of an SDI (serial digital interface) used for transmitting the video data, in a case where an audio is sampled at an interval of once or less for horizontal lines of n1 (here, $n1 \geq 2$) rows of the video data of a predetermined frame rate.

The audio multiplexing unit can be configured to multiplex the audio sample into the data area of horizontal lines of n2 rows continuous from a second horizontal line that is a next line of the first horizontal line.

The frame rate of the video data can be in a range of 96 Hz to 120 Hz, a sampling rate of the audio can be in a range of 32 kHz to 96 kHz, and the audio multiplexing unit can be configured to multiplex the audio sample into the data area of horizontal lines of two rows continuous from the second horizontal line.

The audio multiplexing unit can be configured to multiplex a maximum of eight audio data packets including a maximum of four audio samples into one data area.

The audio multiplexing unit can be configured to multiplex the audio sample with the data area of the next horizontal line of a horizontal line including a switching point being skipped.

The audio multiplexing unit can be configured to set a flag that represents whether or not the horizontal line into which the audio sample is multiplexed is shifted to a rear side due to an influence of the switching point in the data area of the horizontal line.

A video signal processing unit that generates the data stream into which the video data is multiplexed can be further disposed.

A signal processing method according to the first aspect of the present technology includes multiplexing an audio sample into a data area of horizontal lines of n2 (here, $2 \leq n2 \leq n1$) rows after a first horizontal line in which the audio sample is generated, which is a predetermined data area arranged within a horizontal blanking area disposed for each horizontal line of video data in a data stream defined in a format of an SDI (serial digital interface) used for transmitting the video data, in a case where an audio is sampled at an interval of once or less for horizontal lines of n1 (here, $n1 \geq 2$) rows of the video data of a predetermined frame rate by using a signal processing apparatus.

A program according to the first aspect of the present technology causes a computer to execute multiplexing an audio sample into a data area of horizontal lines of n2 (here, $2 \leq n2 \leq n1$) rows after a first horizontal line in which the audio sample is generated, which is a predetermined data area arranged within a horizontal blanking area disposed for each horizontal line of video data in a data stream defined in a format of an SDI (serial digital interface) used for transmitting the video data, in a case where an audio is sampled at an interval of once or less for horizontal lines of n1 (here, $n1 \geq 2$) rows of the video data of a predetermined frame rate.

A signal processing apparatus according to a second aspect of the present technology includes a reproduction unit that restores an audio stream including an audio sample by extracting the audio sample from a data stream in which the audio sample is multiplexed into a data area of horizontal lines of n2 (here, $2 \leq n2 \leq n1$) rows after a first horizontal line in which the audio sample is generated, which is a predetermined data area arranged within a horizontal blanking area disposed for each horizontal line of video data in the data stream defined in a format of an SDI (serial digital interface) used for transmitting the video data by sampling an audio at an interval of once or less for horizontal lines of n1 (here, $n1 \geq 2$) rows of the video data of a predetermined frame rate.

A signal processing method according to the second aspect of the present technology includes restoring, by a signal processing apparatus, an audio stream including an audio sample by extracting the audio sample from a data stream in which the audio sample is multiplexed into a data area of horizontal lines of n2 (here, $2 \leq n2 \leq n1$) rows after a first horizontal line in which the audio sample is generated, which is a predetermined data area arranged within a horizontal blanking area disposed for each horizontal line of video data in the data stream defined in a format of an SDI (serial digital interface) used for transmitting the video data by sampling an audio at an interval of once or less for horizontal lines of n1 (here, n1≥2) rows of the video data of a predetermined frame rate.

A program according to the second aspect of the present technology causes a computer to execute restoring an audio stream including an audio sample by extracting the audio sample from a data stream in which the audio sample is multiplexed into a data area of horizontal lines of n2 (here, 2≤n2≤n1) rows after a first horizontal line in which the audio sample is generated, which is a predetermined data area arranged within a horizontal blanking area disposed for each horizontal line of video data in the data stream defined in a format of an SDI (serial digital interface) used for transmitting the video data by sampling an audio at an interval of once or less for horizontal lines of n1 (here, n1≥2) rows of the video data of a predetermined frame rate.

A signal transmission system according to a third aspect of the present technology includes: a signal transmission apparatus including: an audio multiplexing unit that multiplexes an audio sample into a data area of horizontal lines of n2 (here, 2≤n2≤n1) rows after a first horizontal line in which the audio sample is generated, which is a predetermined data area arranged within a horizontal blanking area disposed for each horizontal line of video data in a data stream defined in a format of an SDI (serial digital interface) used for transmitting the video data, in a case where an audio is sampled at an interval of once or less for horizontal lines of n1 (here, n1≥2) rows of the video data of a predetermined frame rate; and a transmission control unit that controls transmission of the data stream into which the audio sample is multiplexed; and a signal reception apparatus including: a reception control unit that controls reception of the data stream; and a reproduction unit that extracts the audio sample from the data stream and restores an audio stream including the audio sample.

According to the first aspect of the present technology, an audio sample is multiplexed into a data area of horizontal lines of n2 (here, 2≤n2≤n1) rows after a first horizontal line in which the audio sample is generated, which is a predetermined data area arranged within a horizontal blanking area disposed for each horizontal line of video data in a data stream defined in a format of an SDI (serial digital interface) used for transmitting the video data, in a case where an audio is sampled at an interval of once or less for horizontal lines of n1 (here, n1≥2) rows of the video data of a predetermined frame rate.

According to the second aspect of the present technology, an audio stream including an audio sample is restored by extracting the audio sample from a data stream in which the audio sample is multiplexed into a data area of horizontal lines of n2 (here, 2≤n2≤n1) rows after a first horizontal line in which the audio sample is generated, which is a predetermined data area arranged within a horizontal blanking area disposed for each horizontal line of video data in a data stream defined in a format of an SDI (serial digital interface) used for transmitting the video data by sampling an audio at an interval of once or less for horizontal lines of n1 (here, n1≥2) rows of the video data of a predetermined frame rate.

According to the third aspect of the present technology, an audio sample is multiplexed into a data area of horizontal lines of n2 (here, 2≤n2≤n1) rows after a first horizontal line in which the audio sample is generated, which is a predetermined data area arranged within a horizontal blanking area disposed for each horizontal line of video data in a data stream defined in a format of an SDI (serial digital interface) used for transmitting the video data, in a case where an audio is sampled at an interval of once or less for horizontal lines of n1 (here, n1≥2) rows of the video data of a predetermined frame rate, the data stream into which the audio sample is multiplexed is transmitted, the data stream is received, and the audio sample is extracted from the data stream, and an audio stream including the audio sample is restored.

Effects of the Invention

According to first to third aspects of the present technology, an SDI capable of efficiently transmitting an audio stream together with video data, for example, of which the frame rate is in the range of 96 Hz to 120 Hz can be realized.

BRIEF DESCRIPTION OF DRAWINGS

FIG. 2 is a diagram that illustrates usable areas of the audio data packet defined in SMPTE 299-1.

FIG. 7 is a diagram that illustrates an example of a method of multiplexing an audio data packet.

FIG. 11 is a block diagram that illustrates an example of the configuration of a computer.

MODE FOR CARRYING OUT THE INVENTION

Hereinafter, modes of the present technology (hereinafter, referred to as embodiments) will be described. The description will be presented in the following order.
1. Current System of Multiplexing Audio Stream of High Definition-Serial Digital Interface (HD-SDI)
2. Embodiment of Present Technology
3. Modified Example

1. CURRENT SYSTEM OF MULTIPLEXING AUDIO STREAM OF HD-SDI

A current system of multiplexing an audio stream into a data stream (hereinafter, simply, also referred to as an HD-SDI) defined in the HD-SDI format of 1.485 Gbps is defined in SMPTE 299-1. In addition, the format of an audio stream multiplexed into the HD-SDI is defined by audio engineering society (AES) 3.

Figure 1:
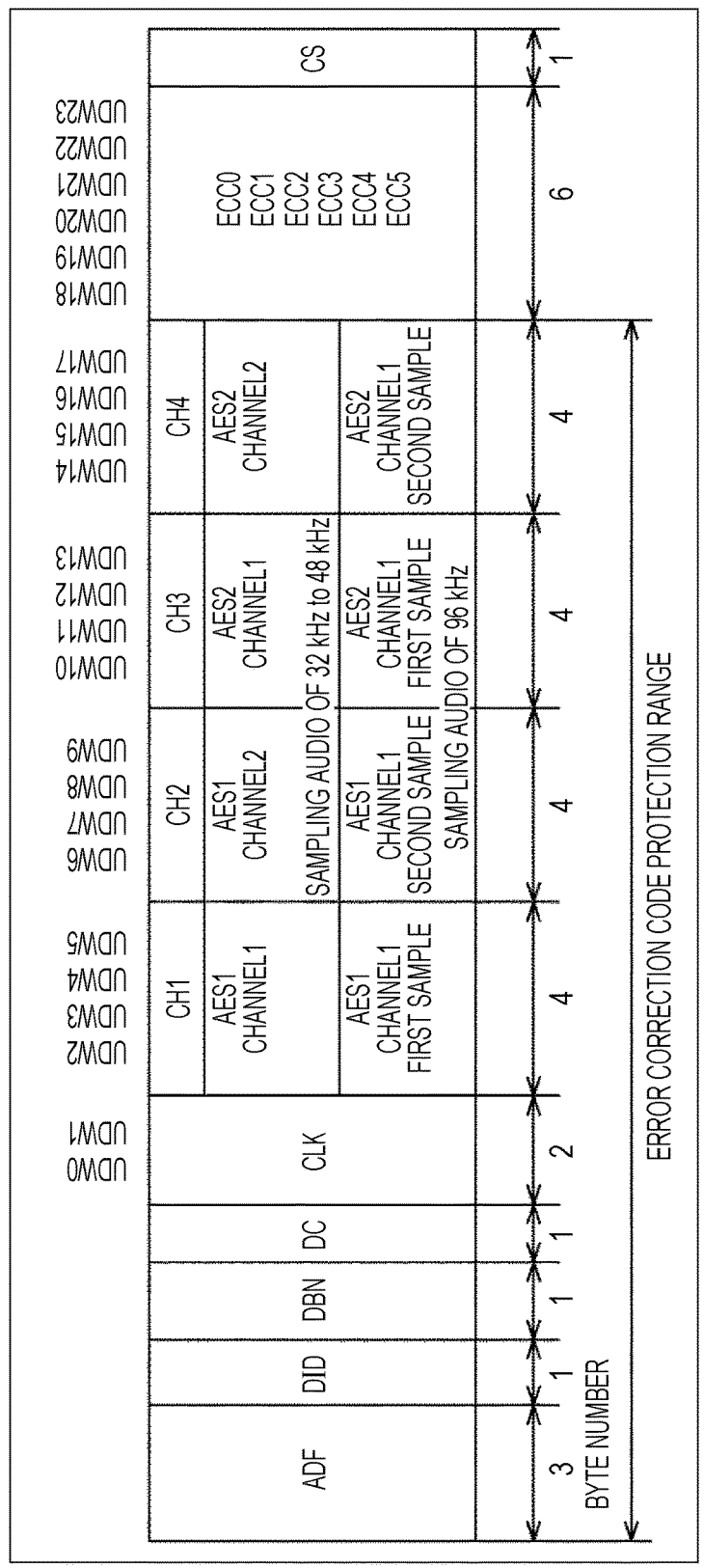
FIG. 1 is a diagram that illustrates the data structure of an audio data packet defined in SMPTE 299-1.

FIG. 1 illustrates the data structure of an audio data packet defined in SMPTE 299-1.

One audio data packet includes: an auxiliary data flag ADF; a data ID DID; a data block number DBN; a data count DC; an audio clock phase data CLK; audio data of a total of four channels CH1 to CH4; an error correction code configured by ECC0 to ECC5; and a check sum CS. The range from the ADF to the CH4 is protected by the error correction code. In addition, the length of one audio data packet is 31 bytes. Here, one byte is 10 bits, and, hereinafter, one byte will be referred to also as one word.

In each of the channels CH1 to CH4, one sample of audio data (hereinafter, referred to as an audio sample) is included. In a case where the sampling rate of an audio stream is 32 kHz, 44.1 kHz, or 48 kHz, audio data of four channels can be multiplexed into one audio data packet. In other words, audio samples of respective two channels (Channels 1 and 2) of an AES sub frame 1 and an AES sub frame 2, which are continuous, can be multiplexed into one audio data packet.

On the other hand, in a case where the sampling rate of the audio stream is 96 kHz, audio data of two channels can be multiplexed into one audio data packet. In other words, a first audio sample and a second audio sample of Channel 1 of an AES sub frame 1 and an AES sub frame 2, which are continuous, can be multiplexed into one audio data packet.

Figure 2:
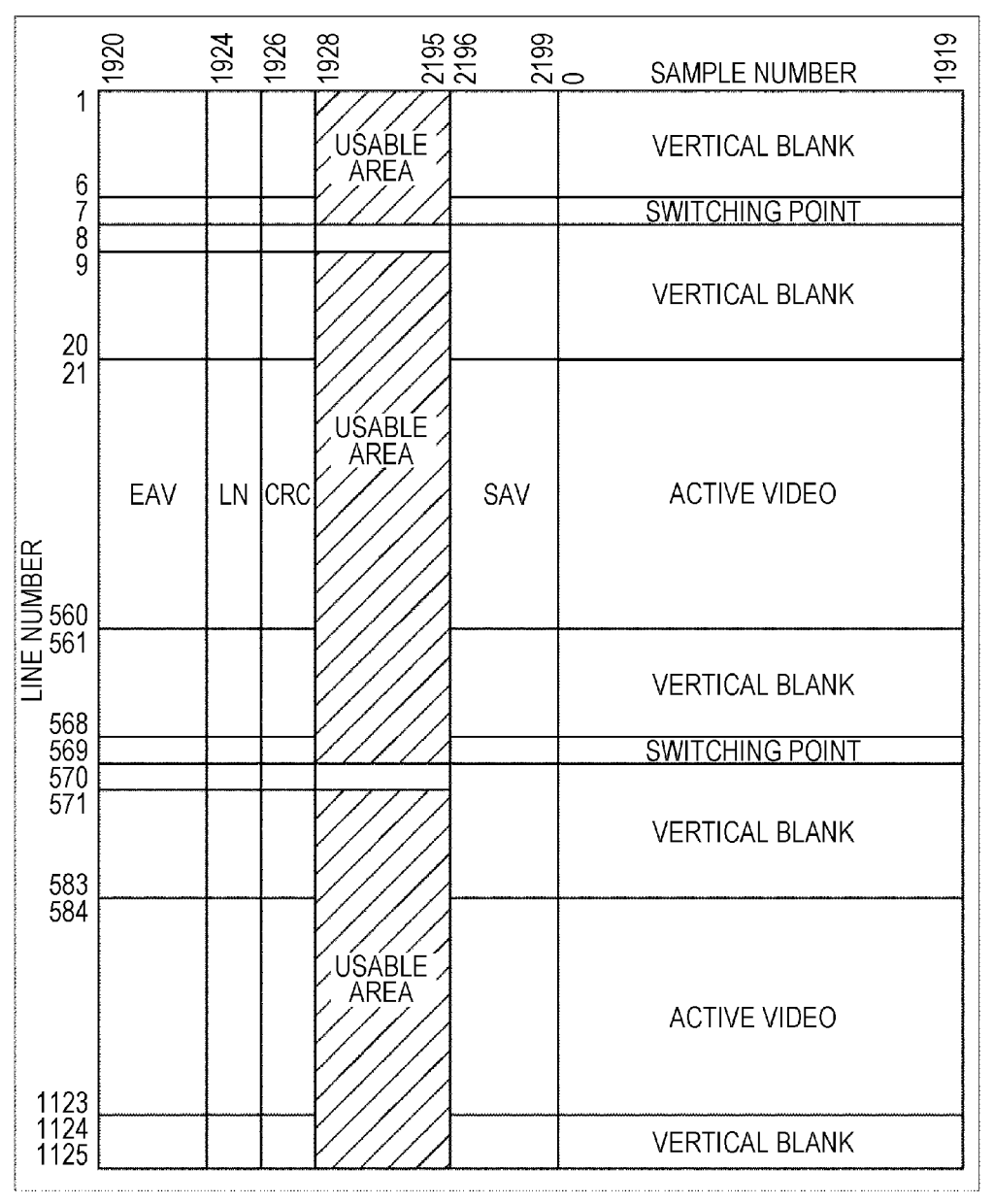

FIG. 2 illustrates usable areas of the audio data packet defined in SMPTE 299-1. In addition, FIG. 2 illustrates usable areas of an audio data packet in video data of 60I of 2,200 samples×1,125 lines that is defined in SMPTE 292-1.

The audio data packet can be multiplexed into a horizontal auxiliary data area acquired by excluding areas of start of active video SAV, end of active video EAV, a line number LN, and cyclic redundancy check CRCC from a horizontal blanking area of a data stream of a Cb/Cr series (hereinafter, referred to as a C-series data stream). However, the audio data packet cannot be multiplexed into a horizontal auxiliary data area of the next horizontal line of a horizontal line including a switching point (hereinafter, simply, referred to also as a line).

However, in a case where the sampling rate of the audio stream is 48 kHz, the average number of times of sampling the audio per one line of video data is about 1.42 (=48 kHz/30 Hz/1,125 lines) times. Thus, the number of times of sampling per one line is two times at the ratio of once or less for two lines, and it is necessary to transmit an audio data packet at a maximum of two times for one line. Meanwhile, since the horizontal auxiliary data area is 268 bytes, two packet streams each including four audio data packets of 31 bytes can be multiplexed into one line.

Thus, in a case where the sampling rate of the audio stream is 48 kHz, since audio data of four channels is included in one audio data packet, audio data of a maximum of 16 channels can be transmitted. On the other hand, in a case where the sampling rate of the audio stream is 96 kHz, since audio data of two channels is included in one audio data packet, audio data of a maximum of eight channels can be transmitted.

2. EMBODIMENT OF PRESENT TECHNOLOGY

Next, embodiments of the present technology will be described with reference to FIGS. 3 to 9.

[Example of Configuration of Signal Transmission System 1]

Figure 3:
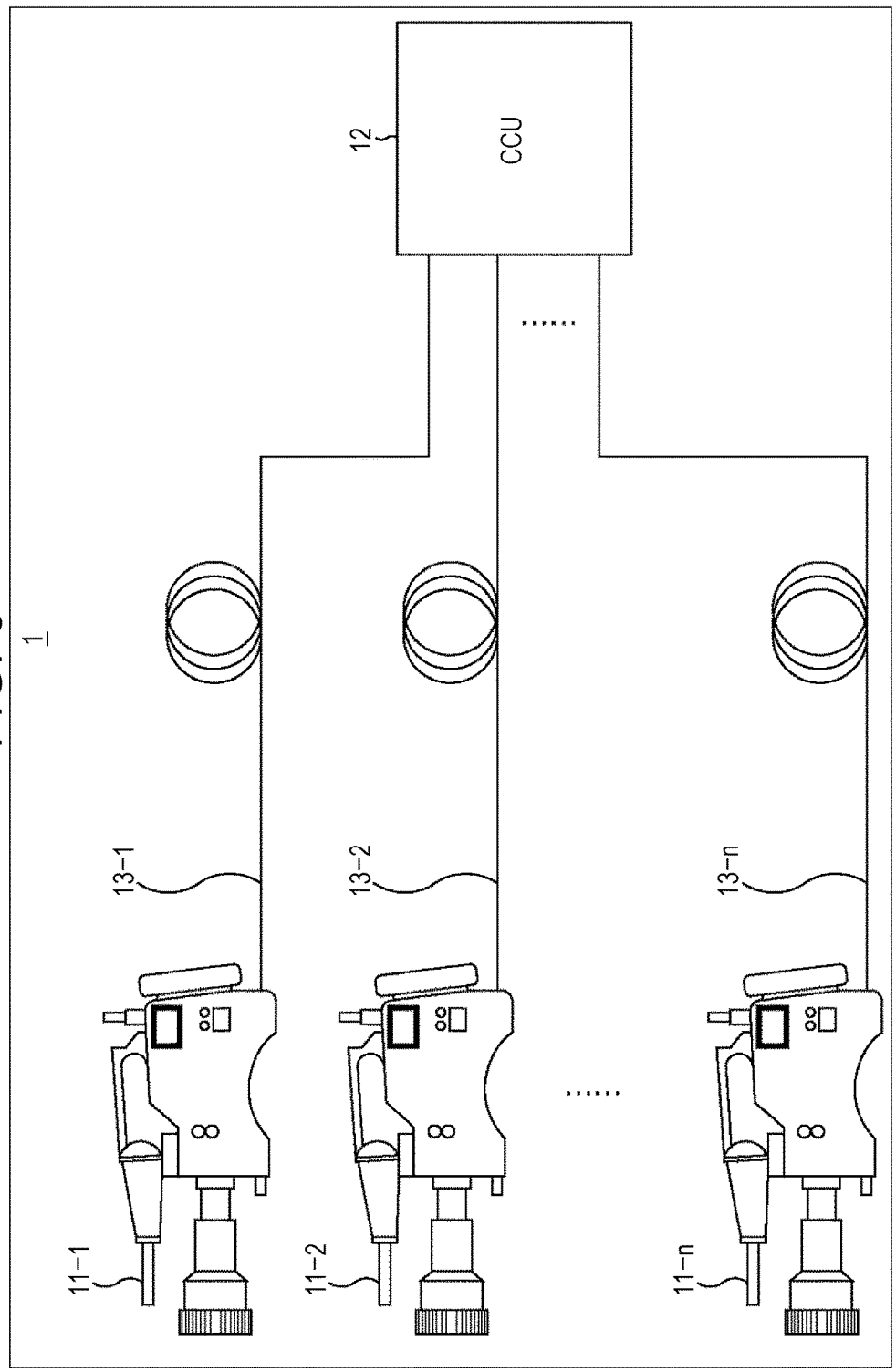
FIG. 3 is a block diagram that illustrates a signal transmission system according to an embodiment to which the present technology is applied.

FIG. 3 is a block diagram that illustrates a signal transmission system 1 according to an embodiment to which the present technology is applied.

The signal transmission system 1 is configured to include: n broadcast cameras 11-1 to 11-n; and a camera control unit (CCU) 12. The broadcast cameras 11-1 to 11-n are connected to the CCU 12 respectively through optical fiber cables 13-1 to 13-n.

Hereinafter, in a case where the broadcast cameras 11-1 to 11-n do not need to be individually discriminated from each other, each thereof will be simply referred to as a broadcast camera 11. In addition, hereinafter, in a case where the optical fiber cables 13-1 to 13-n do not need to be individually discriminated from each other, each thereof will be simply referred to as an optical fiber cable 13.

The broadcast camera 11 is used as a signal transmission apparatus that transmits a signal (data stream) by using an SDI used for transmitting video data of which the frame rate is 100 Hz or 120 Hz (hereinafter, referred to as a 100 Hz-SDI or a 120 Hz-SDI). In addition, the CCU 12 is used as a signal reception apparatus that receives a signal (data stream) by using the 100 Hz-SDI or the 120 Hz-SDI. The signal transmission system 1 acquired by combining the broadcast cameras 11 and the CCU 12 is used as a signal transmission system that transmits a signal (data stream) by using the 100 Hz-SDI or the 120 Hz-SDI.

Each broadcast camera 11 transmits video data (2K video data) of 2,200 samples×1,125 lines or 2,640 samples×1,125 lines, which is acquired by a photographing process, to the CCU 12 through the optical fiber cable 13. This video data is configured as video data of a progressive system of which the frame rate is 100 Hz or 120 Hz (video data of 100P or 120P) or video data of which the field rate is 200 Hz or 240 Hz (video data of 200I or 240I).

The CCU 12 controls each broadcast camera 11, receives video data from each broadcast camera 11, and transmits video data (return data) used for displaying a video on a monitor of each broadcast camera 11 which is in the middle of the photographing process using the other broadcast cameras 11.

[Example of Circuit Configuration of Broadcast Camera 11]

Figure 4:
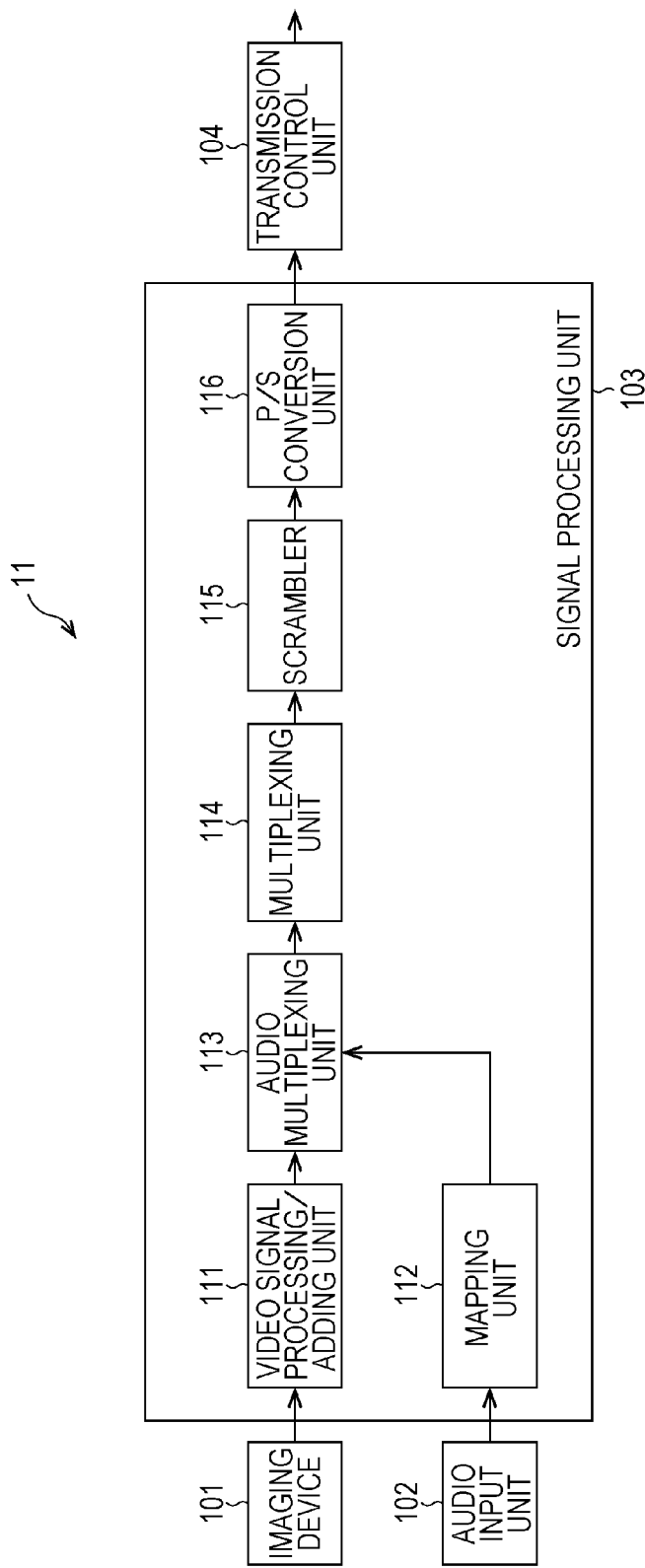
FIG. 4 is a block diagram that illustrates an example of the configuration of a part of a broadcast camera that relates to an embodiment of the present technology.

FIG. 4 is a block diagram that illustrates an example of the configuration of a part of the broadcast camera 11 that relates to an embodiment of the present technology.

The broadcast camera 11a is configured to include: an imaging device 101; an audio input unit 102; a signal processing unit 103; and a transmission control unit 104. In addition, the signal processing unit 103 is configured to include: a video signal processing/adding unit 111; a mapping unit 112; an audio multiplexing unit 113; a multiplexing unit 114; a scrambler 115; and a parallel/serial (P/S) conversion unit 116.

The imaging device 101, for example, is configured by a CMOS image sensor, a CCD image sensor, or the like. The imaging device 101 supplies video data of 100P, 120P, 200I, or 240I acquired as a result of a photographing process to the video signal processing/adding unit 111 of the signal processing unit 103.

The format of the video data generated by the imaging device 101 is not particularly limited. For example, the format of a multi-color space such as an RGB space or a YCbCr space can be employed. In addition, for example, in the case of the YCbCr space, an arbitrary system among 4:4:4, 4:2:2, 4:1:1, 4:2:0, and the like can be employed.

Hereinafter, a case will be described as an example in which the 4:2:2 system of YCbCr is employed as the format of the color space of the video data.

The audio input unit 102, for example, is configured by a microphone, an audio processing device, and the like. The audio input unit 102 collects audios of a plurality of channels in parallel with a photographing process executed by the imaging device 101. In addition, the audio input unit 102 generates an audio stream including digital audio data of the plurality of channels by sampling the collected audios of the plurality of channels at a predetermined sampling rate and supplies the generated audio stream to the mapping unit 112 of the signal processing unit 103. The sampling rate, for example, is set to be in the range of 32 kHz to 96 kHz (for example, 32 kHz, 44.1 kHz, 48 kHz, 96 kHz, or the like).

The video signal processing/adding unit 111 executes video processing such as a flaw correction, a gamma correction, a color space conversion, and the like for the video data. In addition, the video signal processing/adding unit 111 generates a plurality of data streams acquired by multiplexing video data. In other words, the video signal processing/adding unit 111 multiplexes video data into a plurality of data streams of a predetermined format. In addition, the video signal processing/adding unit 111 adds predetermined information to the plurality of data streams. Then, the video signal processing/adding unit 111 supplies the plurality of data streams that have been generated to the audio multiplexing unit 113.

The audio multiplexing unit 113 multiplexes an audio stream into at least one of the plurality of data streams supplied from the video signal processing/adding unit 111. The audio multiplexing unit 113 supplies a plurality of data streams including the data stream into which the audio stream is multiplexed to the multiplexing unit 114.

The multiplexing unit 114 generates one data stream by multiplexing a plurality of data streams by using a predetermined method. The multiplexing unit 114 supplies the generated data stream to the scrambler 115.

The scrambler 115 executes a scrambling process of a predetermined system for the data stream and supplies the data stream after the scrambling process to the parallel/serial conversion unit 116.

The parallel/serial conversion unit 116 executes a parallel/serial conversion of a data stream and supplies the data stream after the conversion to the transmission control unit 104.

The transmission control unit 104 controls the transmission of the data stream to the CCU 12.

[Example of Circuit Configuration of CCU 12]

Figure 5:
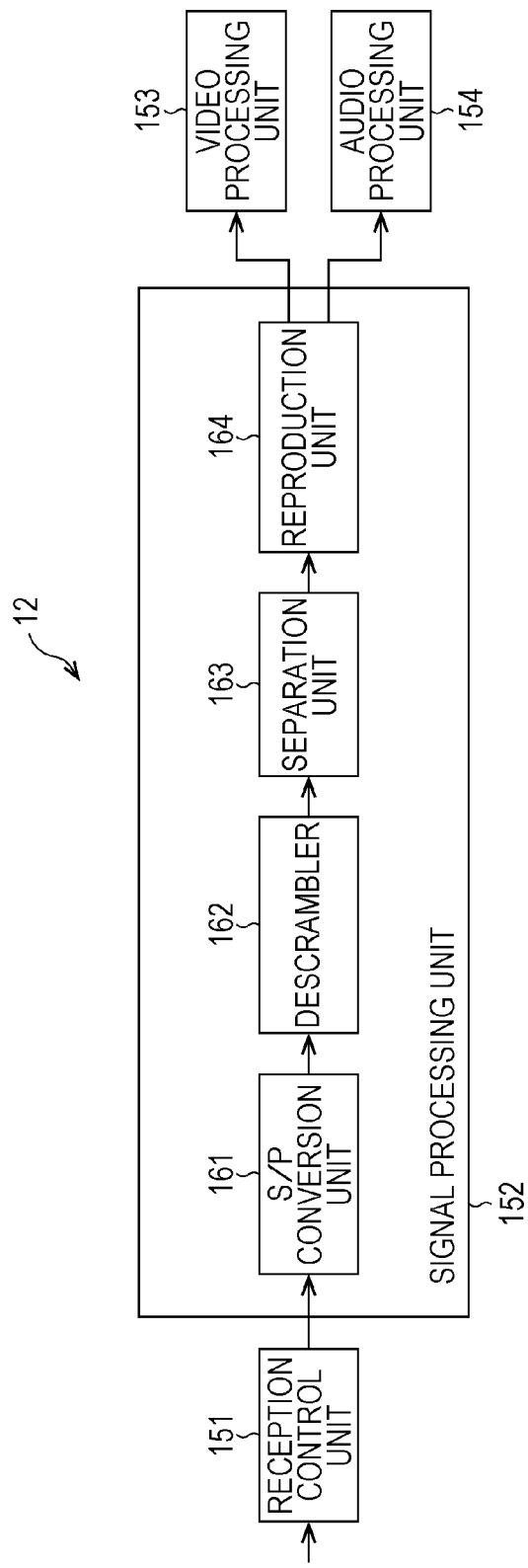
FIG. 5 is a block diagram that illustrates an example of the configuration of a part of a CCU that relates to an embodiment of the present technology.

FIG. 5 is a block diagram that illustrates an example of the configuration of a part of the CCU 12 that relates to an embodiment of the present technology.

The CCU 12 is configured to include: a reception control unit 151; a signal processing unit 152; a video processing unit 153; and an audio processing unit 154. In addition, the signal processing unit 152 is configured to include: a serial parallel (S/P) conversion unit 161; a descrambler 162; a separation unit 163; and a reproduction unit 164.

The reception control unit 151 controls the reception of a data stream supplied from each broadcast camera 11. The reception control unit 151 supplies the received data stream to the serial/parallel conversion unit 161 of the signal processing unit 152.

The serial/parallel conversion unit 161 executes a serial/parallel conversion of the data stream and supplies the data stream after the conversion to the descrambler 162.

The descrambler 162 executes a descrambling process, which is an inverse process of the process executed by the scrambler 115 of the broadcast camera 11, for a data stream and supplies the data stream after the descrambling process to the separation unit 163.

The separation unit 163 separates a data stream into a plurality of data streams by executing an inverse process of the process executed by the multiplexing unit 114 of the broadcast camera 11 and supplies the plurality of data streams to the reproduction unit 164.

The reproduction unit 164 extracts data of each pixel that is multiplexed into a plurality of data streams, restores original video data including the extracted pixel data, and supplies the restored original video data to the video processing unit 153. In addition, the reproduction unit 164 extracts an audio sample multiplexed into the plurality of data streams, restores an original audio stream including the extracted audio sample, and supplies the restored original audio stream to the audio processing unit 154.

The video processing unit 153 is configured by a device that executes various processes for video data and executes a predetermined process for video data supplied from the reproduction unit 164. For example, the video processing unit 153 is configured by a display displaying a video that is based on video data, a storage device storing video data, and the like.

The audio processing unit 154 is configured by a device that executes various processes for audio data and executes a predetermined process for audio data supplied from the reproduction unit 164. For example, the audio processing unit 154 is configured by a speaker outputting an audio that is based on the audio data, a storage device storing the audio data, and the like.

In addition, depending on a content to be processed, the video processing unit 153 and the audio processing unit 154 may be configured by using one device.

[Signal Transmission Process]

Figure 6:
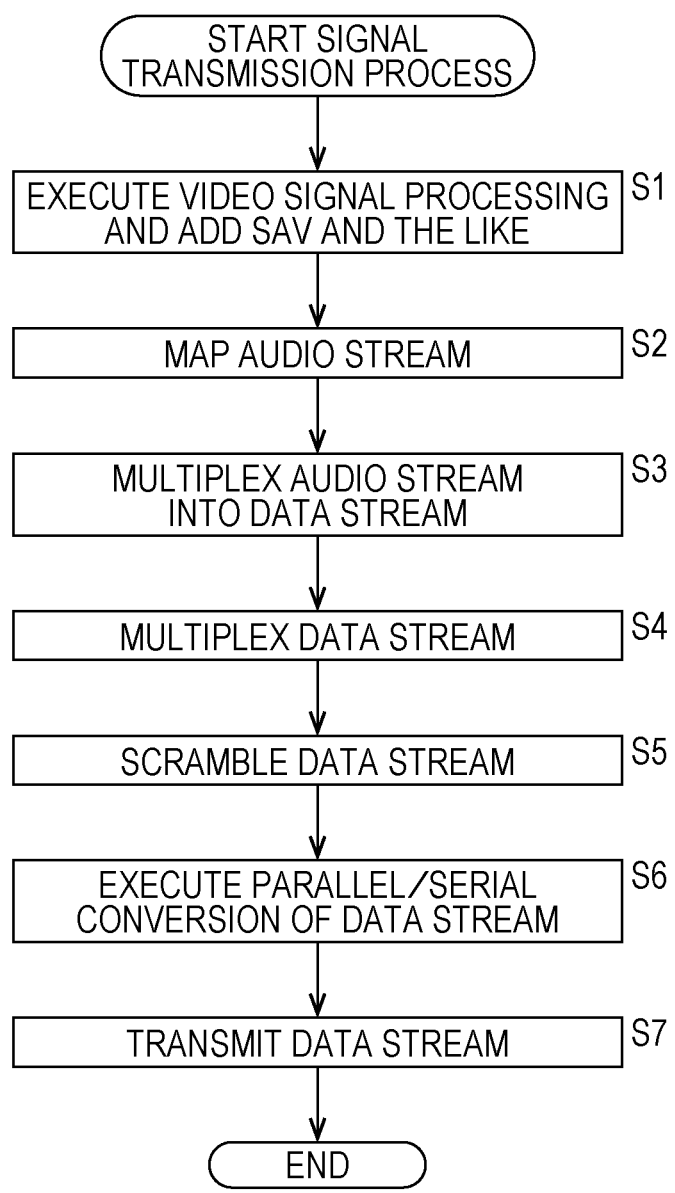
FIG. 6 is a flowchart that illustrates a signal transmission process.

Next, the signal transmission process executed by the broadcast camera 11 will be described with reference to a flowchart represented in FIG. 6. This process illustrates a process of a case where video data corresponding to one frame is transmitted, and, in a case where video data of a plurality of frames is transmitted, the process is repeatedly executed.

In Step S1, the video signal processing/adding unit 111 executes video signal processing and addition of SAV and the like. More specifically, the video signal processing/adding unit 111 executes video processing such as a flaw correction, a gamma correction, and a color space conversion for video data supplied from the imaging device 101. In addition, the video signal processing/adding unit 111, for example, divides Y-series data and C-series (CbCr) data of video data into two data streams having a configuration similar to that defined in SMPTE 274 and multiplexes the data streams. Furthermore, the video signal processing/adding unit 111 adds the same SAV, EAV, LN, and CRCC as those represented in the specification of SMPTE 274 to the two data streams that have been generated. The video signal processing/adding unit 111 supplies the two data streams that have been generated to the audio multiplexing unit 113.

In Step S2, the mapping unit 112 executes mapping of an audio stream. More specifically, the mapping unit 112 maps the audio stream supplied from the audio input unit 102 into a format defined in AES3. The mapping unit 112 supplies the audio stream after mapping to the audio multiplexing unit 113.

In Step S3, the audio multiplexing unit 113 multiplexes the audio stream into a data stream. More specifically, the audio multiplexing unit 113 multiplexes the audio stream into one data stream (for example, the C-series data stream) of the two data streams.

For example, in a case where the sampling rate of the audio stream is 48 kHz, and the frame rate of the video data is 120 Hz (120P or 240I), the average number of times of sampling of an audio per one line of video data is about 0.36 times (=48 kHz/120 Hz/1,125 lines). On the other hand, in a case where the sampling rate of the audio stream is 48 kHz, and the frame rate of the video data is 100 Hz (100P or 200I), the average number of times of sampling of an audio per one line of video data is about 0.43 times (=48 kHz/100 Hz/1, 125 lines).

Accordingly, in a case where the frame rate of the video data is 120 Hz or 100 Hz, the audio is sampled at the interval of once or less for two lines of the video data. More specifically, the audio data is sampled at a shortest interval of once for two lines and at a longest interval of once for three lines, whereby an audio sample is generated. In addition, for a next line of a line for which an audio sample is generated through the sampling of the audio data (hereinafter, referred to as a sampling line), sampling is not executed, and accordingly, any audio sample is not generated.

Thus, the audio multiplexing unit 113, basically, in a horizontal auxiliary data area of lines of two rows that are continuous from the next line of the sampling line, as illustrated in FIG. 7, multiplexes a maximum of two packet streams each including a maximum of four units of audio packet data having a configuration similar to that defined in SMPTE 299-1 each time. In one audio data packet, since audio samples corresponding to four channels are included, audio samples corresponding to 16 channels per one packet stream is included. In addition, every time when sampling of audio data is executed once, a maximum of 16 audio data packets of 8×two rows are multiplexed into a data stream, and accordingly, audio data of a maximum of 64 channels can be multiplexed into a data stream.

In addition, in a case where the sampling rate of the audio data is 96 kHz, audio data of a maximum of 32 channels, which correspond to a half of that of the case of 48 kHz, can be multiplexed into a data stream.

Furthermore, similar to the specification of SMPTE 299-1, the multiplexing of an audio data packet into the horizontal auxiliary data area of the next line of the switching point is prohibited. For this reason, as illustrated in FIGS. 8 and 9, due to the influence of a switching line, there are cases where the multiplexing position of the audio data packet is shifted to the rear side.

Figure 8:
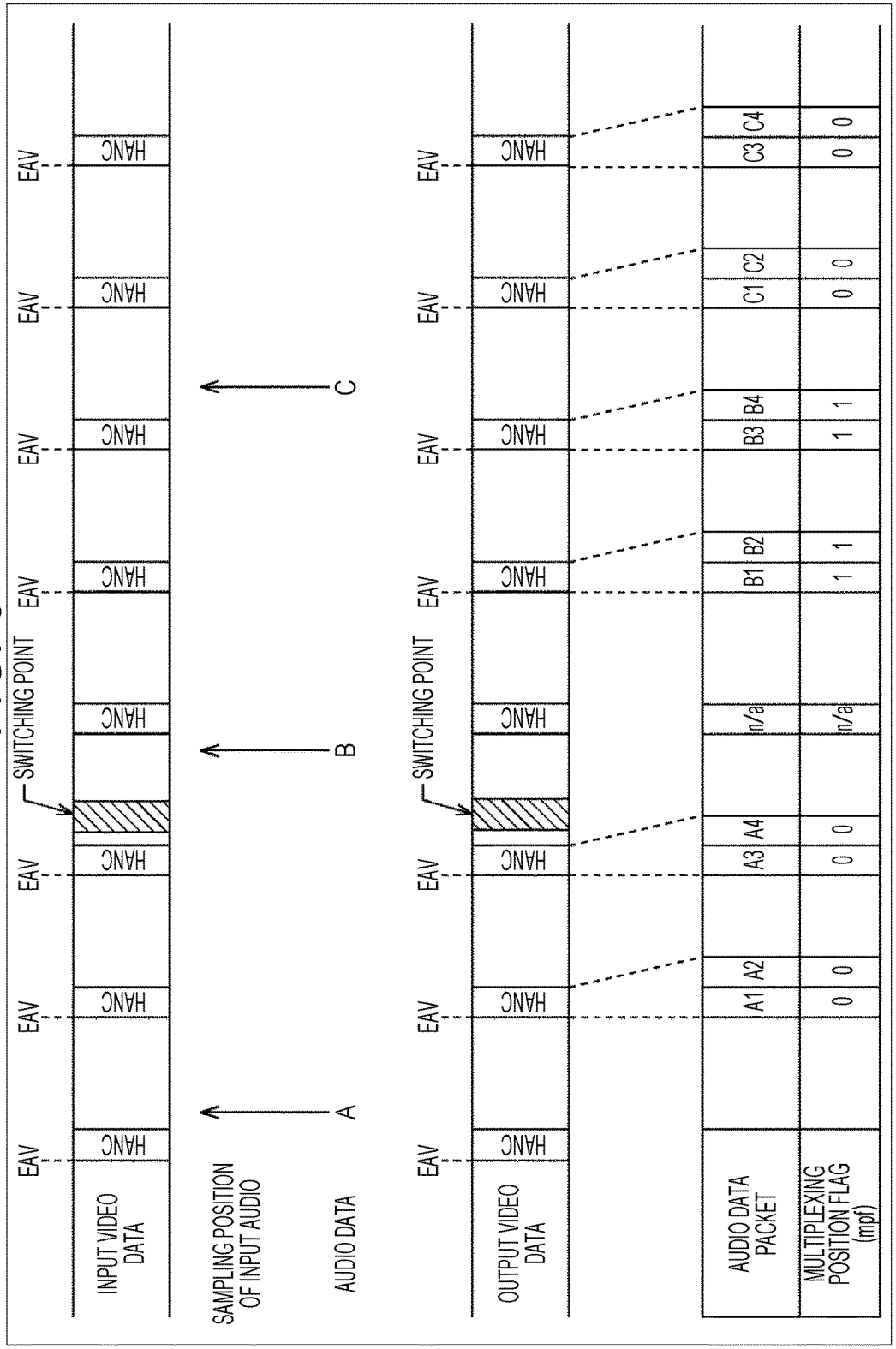
FIG. 8 is a diagram that illustrates an example of a multiplexing position of an audio data packet.
Figure 9:
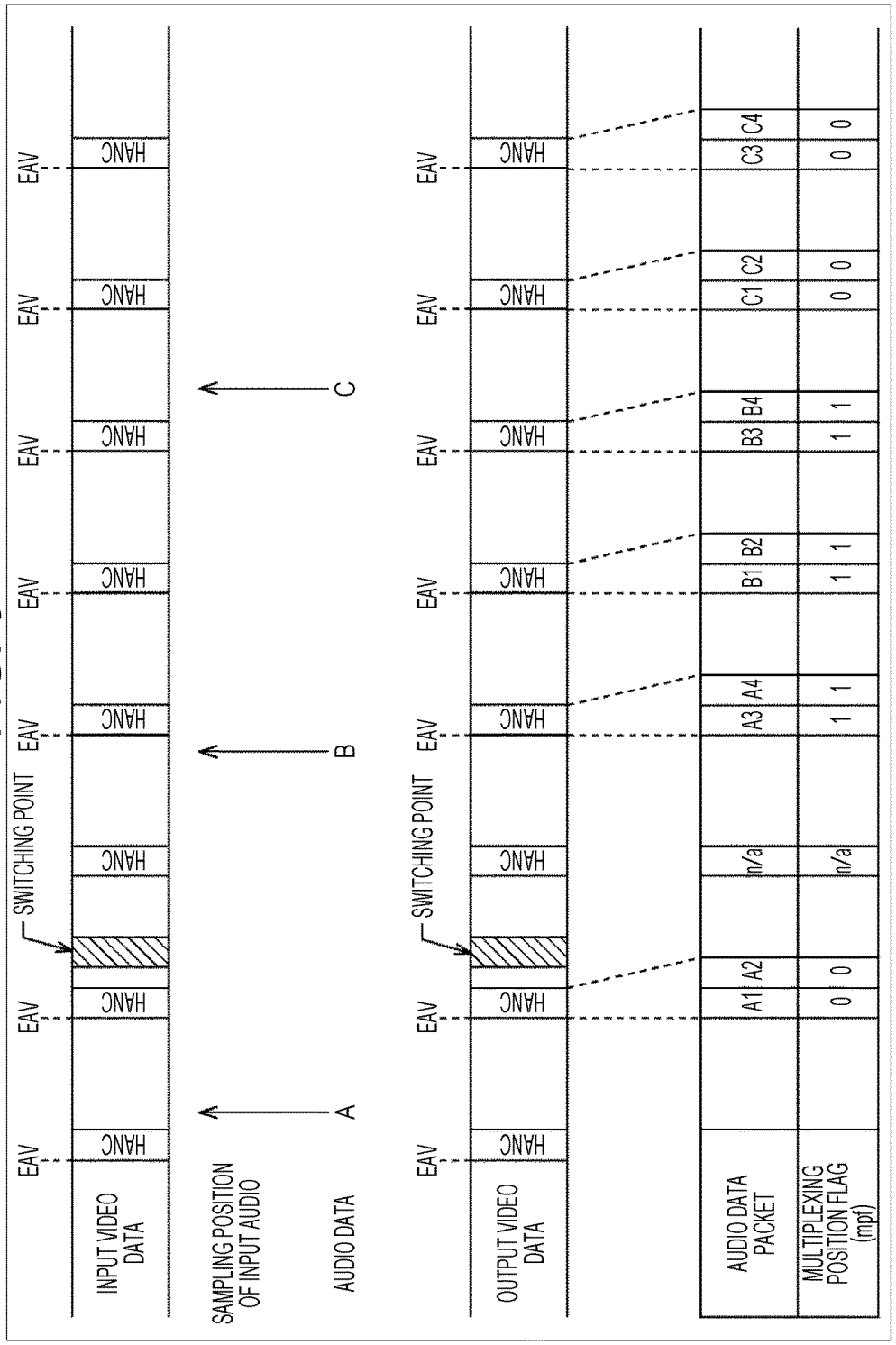
FIG. 9 is a diagram that illustrates another example of a multiplexing position of an audio data packet.

More specifically, FIG. 8 illustrates a case where audio data A to C is sampled, and a switching point is included in the sampling line of the audio data B. In addition, a multiplexing position flag mpf represented in the lowermost level in the figure is a flag that illustrates the relation between a multiplexing position of an audio data packet and a sampling line of corresponding audio data and is set to a predetermined position of CLK of the audio data packet.

In the audio data A, a sampling line and the next line do not include a switching point. Accordingly, packet streams A1 to A4 corresponding to the audio data A are not influenced by the switching point but are multiplexed into a horizontal auxiliary data area of lines of two rows continuous from the next line of the sampling line of the audio data A. In addition, the value of the multiplexing position flag of an audio data packet included in each of the packet streams A1 to A4 is set to "0" representing that the audio data packet is not influenced by the switching point but is multiplexed into a line of a normal position.

Also in the audio data C, similarly, a sampling line and the next line do not include a switching point. Accordingly, packet streams C1 to C4 corresponding to the audio data C are not influenced by the switching point but are multiplexed into a horizontal auxiliary data area of lines of two rows continuous from the next line of the sampling line of the audio data C. In addition, the value of the multiplexing position flag of an audio data packet included in each of the packet streams C1 to C4 is set to "0".

On the other hand, in the audio data B, a sampling line includes a switching point, and an audio data packet cannot be multiplexed into a horizontal auxiliary data area of the next line. Accordingly, packet streams B1 to B4 corresponding to the audio data B are multiplexed into a horizontal auxiliary data area of lines of two rows continuous from a line positioned two rows after the sampling line by skipping the horizontal auxiliary data area of the next line of the sampling line of the audio data B. In addition, the value of the multiplexing position flag of an audio data packet included in each of the packet streams B1 to B4 is set to "1" representing that the audio data packet is multiplexed into a line shifted to a further rear side than a normal case due to the influence of the switching point.

FIG. 9 illustrates a case where audio data A to C is sampled, and a switching point is included in the next line of a sampling line of the audio data A.

In the audio data A, the next line of a sampling line includes a switching point, and audio data packets cannot be multiplexed into a horizontal auxiliary data area of lines positioned two rows after the sampling line. Accordingly, while packet streams A1 and A2 corresponding to the audio data A are multiplexed into the horizontal auxiliary data area of the next line of the sampling line of the audio data A, packet streams A3 and A4 are multiplexed into a horizontal auxiliary data area of lines positioned three rows after the sampling line by skipping one row.

In addition, the value of the multiplexing position flag of an audio data packet included in each of the packet streams A1 and A2 is set to "0". On the other hand, the value of the multiplexing position flag of an audio data packet included in each of the packet streams A3 and A4 is set to "1" representing that the audio data packet is multiplexed into a line shifted to a further rear side than a normal case due to the influence of the switching point.

Furthermore, the packet streams B1 to B4 corresponding to the audio data B are multiplexed into a horizontal auxiliary data area of lines shifted to a further rear side than the normal case by one line due to the shift of the multiplexing positions of the packet streams A3 and A4 to the rear side by one line. Accordingly, the value of the multiplexing position flag of an audio data packet included in each of the packet streams B1 to B4 is set to "1" representing that the audio data packet is multiplexed into a line shifted to a further rear side than the normal case due to the influence of the switching point.

In addition, the multiplexing positions of audio data packets corresponding to the audio data C and the values of the multiplexing position flags are as illustrated in the example of FIG. 8.

Furthermore, the audio multiplexing unit 113 multiplexes an audio control packet similar to that defined in SMPTE 299-1 in a horizontal auxiliary data area of a data stream (for example, a data stream of a Y series) different from the data stream into which the audio stream is multiplexed.

In addition, the audio multiplexing unit 113 uses a value acquired by measuring a position of an audio sample from the first word of the EAV by a formatter by using a clock of 297 MHz, 297/1.110 MHz, or the like as an audio clock phase.

Then, the audio multiplexing unit 113 supplies a data stream acquired by multiplexing an audio stream and an audio control packet to the multiplexing unit 114.

In Step S4, the multiplexing unit 114 multiplexes the data stream. In other words, the multiplexing unit 114 multiplexes two data streams into one data stream in units of words. The multiplexing unit 114 supplies the multiplexed data stream to the scrambler 115.

In Step S5, the scrambler 115 scrambles the data stream by using a method similar to that defined in SMPTE 292-1 and supplies a resultant data stream to the parallel/serial conversion unit 116.

In Step S6, the parallel/serial conversion unit 116 executes a parallel/serial conversion of the data stream and supplies the converted data stream to the transmission control unit 104.

In Step S7, the transmission control unit 104 transmits the data stream to the CCU 12.

Thereafter, the signal transmission process ends.

[Signal Reception Process]

Figure 10:
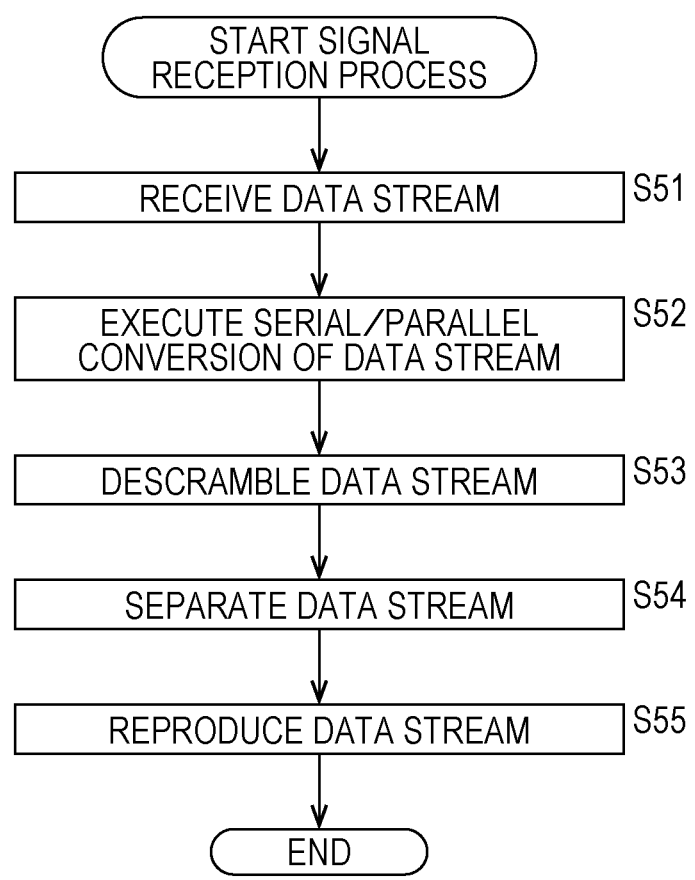
FIG. 10 is a flowchart that illustrates a signal reception process.

Next, a signal reception process executed by the CCU 12 in correspondence with the signal transmission process executed by the broadcast camera 11 illustrated in FIG. 6 will be described with reference to a flowchart represented in FIG. 10. This process represents a process of a case where video data corresponding to one frame is received, and this process is repeatedly executed in a case where video data of a plurality of frames is received.

In Step S51, the reception control unit 151 receives a data stream transmitted from the broadcast camera 11. The reception control unit 151 supplies the received data stream to the serial/parallel conversion unit 161.

In Step S52, the serial/parallel conversion unit 161 executes a serial/parallel conversion of the data stream through an inverse process of the process executed by the parallel/serial conversion unit 116 of the broadcast camera 11. The serial/parallel conversion unit 161 supplies the data stream after the conversion to the descrambler 162.

In Step S53, the descrambler 162 descrambles the data stream through an inverse process of the process executed by the scrambler 115 of the broadcast camera 11. The descrambler 162 supplies the data stream after the descrambling to the separation unit 163.

In Step S54, the separation unit 163 separates data streams through an inverse process of the process executed by the multiplexing unit 114 of the broadcast camera 11. The separation unit 163 supplies the two data streams after the separation to the reproduction unit 164.

In Step S55, the reproduction unit 164 reproduces the data stream. In other words, the reproduction unit 164 extracts data of each pixel that is multiplexed into the two data streams and restores original video data including the extracted pixel data. In addition, the reproduction unit 164 extracts audio samples multiplexed into the two data streams and restores an original audio stream including the extracted audio samples. Then, the reproduction unit 164 supplies the restored video data to the video processing unit 153 and supplies the restored audio data to the audio processing unit 154.

The video processing unit 153 executes predetermined processing such as display of a video that is based on the video data, recording of the video data, and the like for the video data. The audio processing unit 154 executes predetermined processing such as outputting of an audio that is based on the audio data, recording of the audio data, and the like for the audio data.

Thereafter, the signal reception process ends.

In this way, an SDI capable of efficiently transmitting audio data together with video data of which the frame rate is 100 Hz or 120 Hz can be realized. In other words, an SDI that is compliant with SMPTE 299-1, which is a current audio signal multiplexing system of the HD-SDI, and is capable of transmitting audio data of channels of which the number is a maximum of four times that defined in SMPTE 299-1 together with video data can be realized.

3. MODIFIED EXAMPLE

Hereinafter, modified examples of the embodiment according to the present technology described above will be described.

The range to which the present technology is applied is not limited to the frame rates of the video data and the sampling rates of the audio described above but can be applied to a case where the audio is sampled at the interval of once or less for lines of n1 (here, n1≥2) rows of the video data. In such a case, the generated audio sample may be multiplexed into a horizontal auxiliary data area of lines of n2 (here, 2≤n2≤n1) rows after the sampling line in which the audio sample is generated. In this way, compared to a case where an audio sample is multiplexed into a horizontal auxiliary data area of one line, audio data of more number of channels can be multiplexed into a data stream and be transmitted. More specifically, for example, it may be considered to set the frame rate of the video data to 96 Hz.

In addition, the multiplexing position of the audio data packet does not necessarily start from the next line of a sampling line of a corresponding audio sample but, for example, may start from a line after two or more rows. Furthermore, audio samples generated by executing sampling once may be intermittently multiplexed into a plurality of lines instead of being multiplexed into a plurality of continuous lines.

In addition, the format of the video data is not particularly limited but may be a format that can be multiplexed into a data stream of an SDI. Similarly, as the format of the audio data, any format other than the AES3 may be employed, as long as it can be multiplexed into a data stream of the SDI.

Furthermore, the frame size of the video data is not limited to that described in the example described above but may be set to a difference value.

[Example of Configuration of Computer]

A series of the processes described above can be performed either by hardware or by software. In a case where the series of the processes is performed by software, a program configuring the software is installed to a computer. Here, the computer includes a computer that is built in dedicated hardware, a computer such as a general-purpose personal computer that can execute various functions by installing various programs thereto, and the like.

FIG. 11 is a block diagram that illustrates an example of the hardware configuration of a computer that executes the series of processes described above by using a program.

In the computer, a CPU (Central Processing Unit) 301, a ROM (Read Only Memory) 302, and a RAM (Random Access Memory) 303 are interconnected through a bus 304.

In addition, an input/output interface 305 is connected to the bus 304. An input unit 306, an output unit 307, a storage unit 308, a communication unit 309, and a drive 310 are connected to the input/output interface 305.

The input unit 306 is configured by a keyboard, a mouse, a microphone, and the like. The output unit 307 is configured by a display, a speaker, and the like. The storage unit 308 is configured by a hard disk, a non-volatile memory, and the like. The communication unit 309 is configured by a network interface and the like. The drive 310 drives a magnetic disk, an optical disc, a magneto-optical disk, or a removable medium 311 such as a semiconductor memory.

In the computer configured as above, the CPU 301, for example, loads a program stored in the storage unit 308 into the RAM 303 through the input/output interface 305 and the bus 304 and executes the loaded program, thereby executing the series of the processes described above.

The program executed by the computer (the CPU 301), for example, may be provided with being recorded on a removable medium 311 as a package medium or the like. In addition, the program may be provided through a wired or wireless transmission medium such as a local area network, the Internet, or digital satellite broadcast.

In the computer, by loading the removable medium 311 into the drive 310, the program can be installed to the storage unit 308 through the input/output interface 305. In addition, the program may be received by the communication unit 309 through a wired or wireless transmission medium and be installed to the storage unit 308. Furthermore, the program may be installed to the ROM 302 or the storage unit 308 in advance.

In addition, the program executed by the computer may be a program that executes the processes in a time series along the sequence described in this specification or a program that executes the processes in a parallel manner or at necessary timing such as at the timing of being called.

In this specification, a system represents a set of a plurality of constituent elements (an apparatus, a module (component), and the like), and all the constituent elements do not need to be disposed in a same casing. Thus, a plurality of apparatuses that are housed in separate casings and are connected through a network and one apparatus in which a plurality of modules are housed in one casing are systems.

In addition, the present technology is not limited to the embodiments described above, and various changes can be made therein in a range not departing from the concept of the present technology.

For example, each step described in each flowchart described above may be either executed by one apparatus or executed by a plurality of apparatuses in a shared manner.

Furthermore, in a case where a plurality of processes are included in one step, the plurality of processes included in the one step may be either executed by one apparatus or executed by a plurality of apparatuses in a shared manner.

In addition, for example, the present technology may take configurations as below.

(1)

A signal processing apparatus including:

an audio multiplexing unit that multiplexes an audio sample into a data area of horizontal lines of n2 (here, $2 \leq n2 \leq n1$) rows after a first horizontal line in which the audio sample is generated, which is a predetermined data area arranged within a horizontal blanking area disposed for each horizontal line of video data in a data stream defined in a format of an SDI (serial digital interface) used for transmitting the video data, in a case where an audio is sampled at an interval of once or less for horizontal lines of n1 (here, $n1 \geq 2$) rows of the video data of a predetermined frame rate.

(2)

The signal processing apparatus according to (1), wherein the audio multiplexing unit multiplexes the audio sample into the data area of horizontal lines of n2 rows continuous from a second horizontal line that is a next line of the first horizontal line.

(3)

The signal processing apparatus according to (2), wherein the frame rate of the video data is in a range of 96 Hz to 120 Hz, a sampling rate of the audio is in a range of 32 kHz to 96 kHz, and the audio multiplexing unit multiplexes the audio sample into the data area of horizontal lines of two rows continuous from the second horizontal line.

(4)

The signal processing apparatus according to (3), wherein the audio multiplexing unit multiplexes a maximum of eight audio data packets including a maximum of four audio samples into one data area.

(5)

The signal processing apparatus according to any of (2) to (4), wherein the audio multiplexing unit multiplexes the audio sample with the data area of the next horizontal line of a horizontal line including a switching point being skipped.

(6)

The signal processing apparatus according to (5), wherein the audio multiplexing unit sets a flag that represents whether or not the horizontal line into which the audio sample is multiplexed is shifted to a rear side due to an influence of the switching point in the data area of the horizontal line.

(7)

The signal processing apparatus according to any of (1) to (6), further including a video signal processing unit that generates the data stream into which the video data is multiplexed.

(8)

A signal processing method including:

multiplexing an audio sample into a data area of horizontal lines of n2 (here, $2 \leq n2 \leq n1$) rows after a first horizontal line in which the audio sample is generated, which is a predetermined data area arranged within a horizontal blanking area disposed for each horizontal line of video data in a data stream defined in a format of an SDI (serial digital interface) used for transmitting the video data, in a case where an audio is sampled at an interval of once or less for horizontal lines of n1 (here, $n1 \geq 2$) rows of the video data of a predetermined frame rate by using a signal processing apparatus.

(9)

A program causing a computer to execute:

multiplexing an audio sample into a data area of horizontal lines of n2 (here, $2 \leq n2 \leq n1$) rows after a first horizontal line in which the audio sample is generated, which is a predetermined data area arranged within a horizontal blanking area disposed for each horizontal line of video data in a data stream defined in a format of an SDI (serial digital interface) used for transmitting the video data, in a case where an audio is sampled at an interval of once or less for horizontal lines of n1 (here, $n1 \geq 2$) rows of the video data of a predetermined frame rate.

(10)

A signal processing apparatus including:

a reproduction unit that restores an audio stream including an audio sample by extracting the audio sample from a data stream in which the audio sample is multiplexed into a data area of horizontal lines of n2 (here, $2 \leq n2 \leq n1$) rows after a first horizontal line in which the audio sample is generated, which is a predetermined data area arranged within a horizontal blanking area disposed for each horizontal line of video data in the data stream defined in a format of an SDI (serial digital interface) used for transmitting the video data by sampling an audio at an interval of once or less for horizontal lines of n1 (here, $n1 \geq 2$) rows of the video data of a predetermined frame rate.

(11)

A signal processing method including:

restoring, by a signal processing apparatus, an audio stream including an audio sample by extracting the audio sample from a data stream in which the audio sample is multiplexed into a data area of horizontal lines of n2 (here, 2≤n2≤n1) rows after a first horizontal line in which the audio sample is generated, which is a predetermined data area arranged within a horizontal blanking area disposed for each horizontal line of video data in the data stream defined in a format of an SDI (serial digital interface) used for transmitting the video data by sampling an audio at an interval of once or less for horizontal lines of n1 (here, n1≥2) rows of the video data of a predetermined frame rate.

(12)

A program causing a computer to execute:

restoring an audio stream including an audio sample by extracting the audio sample from a data stream in which the audio sample is multiplexed into a data area of horizontal lines of n2 (here, 2≤n2≤n1) rows after a first horizontal line in which the audio sample is generated, which is a predetermined data area arranged within a horizontal blanking area disposed for each horizontal line of video data in the data stream defined in a format of an SDI (serial digital interface) used for transmitting the video data by sampling an audio at an interval of once or less for horizontal lines of n1 (here, n1≥2) rows of the video data of a predetermined frame rate.

(13)

A signal transmission system including:

a signal transmission apparatus including:

an audio multiplexing unit that multiplexes an audio sample into a data area of horizontal lines of n2 (here, 2≤n2≤n1) rows after a first horizontal line in which the audio sample is generated, which is a predetermined data area arranged within a horizontal blanking area disposed for each horizontal line of video data in a data stream defined in a format of an SDI (serial digital interface) used for transmitting the video data, in a case where an audio is sampled at an interval of once or less for horizontal lines of n1 (here, n1≥2) rows of the video data of a predetermined frame rate; and a transmission control unit that controls transmission of the data stream into which the audio sample is multiplexed; and a signal reception apparatus including:

a reception control unit that controls reception of the data stream; and a reproduction unit that extracts the audio sample from the data stream and restores an audio stream including the audio sample.

REFERENCE SIGNS LIST

1 Signal transmission system
11-1 to 11-*n* Broadcast camera
12 CCU
101 Imaging device
102 Audio input unit
103 Signal processing unit
104 Transmission control unit
111 Video signal processing/adding unit
112 Mapping unit
113 Audio multiplexing unit
114 Multiplexing unit
115 Scrambler
116 Parallel/serial conversion unit
151 Reception control unit
152 Signal processing unit
161 Serial/parallel conversion unit
162 Descrambler
163 Separation unit
164 Reproduction unit

The invention claimed is:

1. A signal processing apparatus, comprising:
a memory that stores instructions; and
at least one processor coupled with the memory, the at least one processor:
generates an audio sample based on a sample operation on an audio; and
multiplexes two packet streams into a first data area of horizontal lines of at least two rows,
wherein the first data area of horizontal lines of at least two rows are subsequent to a second data area of a first horizontal line in which the two packet streams are generated,
wherein a data area is arranged within a horizontal blanking area for each horizontal line of video data in a data stream,
wherein the two packet streams are multiplexed the audio,
wherein the two packet streams are obtained by the sample operation on the audio at an average number of times of the sample operation on the audio per one horizontal line of the video data of a frame rate,
wherein the average number of times of the sample operation on the audio is in a range of 0.36 to 1, and
wherein the frame rate is in a range of 96 Hz to 120 Hz.

2. The signal processing apparatus according to claim 1, wherein the first data area of horizontal lines of at least two rows starts from a third data area of a second horizontal line, and
wherein the second horizontal line corresponds to a next horizontal line of the first horizontal line.

3. The signal processing apparatus according to claim 1, wherein a rate of the sample operation on the audio is in a range of 32 kHz to 96 kHz.

4. The signal processing apparatus according to claim 1, wherein the at least one processor further multiplexes a maximum of eight audio data packets into the first data area, and
wherein each audio data packet of the eight audio data packets includes a maximum of four audio samples.

5. The signal processing apparatus according to claim 4, wherein the at least one processor further multiplexes a maximum of sixteen audio data packets of sixteen rows into the data stream, based on the sample operation on the audio.

6. The signal processing apparatus according to claim 1, wherein the first horizontal line includes a switching point,
wherein a second horizontal line is a next horizontal line of the first horizontal line,
wherein a third horizontal line is a next horizontal line of the second horizontal line, and
wherein the first data area of horizontal lines of at least two rows starts from a fourth data area of the third horizontal line.

7. The signal processing apparatus according to claim 6, wherein the at least one processor further sets a flag based on the switching point in the first horizontal line, and wherein the first data area of horizontal lines of at least two rows is shifted from a third data area of the second horizontal line to the fourth data area of the third horizontal line, based on the set flag.

8. The signal processing apparatus according to claim 1, wherein the at least one processor further generates the data stream based on the video data and the multiplexed two packet streams.

9. The signal processing apparatus according to claim 1, wherein the data stream is defined in a format of an SDI (serial digital interface), and
wherein the at least one processor further transmits the video data of the data stream in the format of the SDI.

10. The signal processing apparatus according to claim 1, wherein the first data area of horizontal lines of the at least two rows starts from a third data area of a second horizontal line, in an absence of a switching point in the first horizontal line.

11. The signal processing apparatus according to claim 1, wherein the at least one processor further multiplexes the two packet streams into a fifth data area of horizontal lines of the at least two rows,
wherein the fifth data area starts from a fourth horizontal line that is positioned two rows after the third horizontal line in which the second data area of the next horizontal line is skipped.

12. A signal processing method, comprising:
generating, by at least one processor, an audio sample based on a sampling operation on an audio; and
multiplexing, by the at least one processor, two packet streams into a first data area of horizontal lines of at least two rows,
  wherein the first data area of horizontal lines of at least two rows are subsequent to a second data area of a first horizontal line in which the two packet streams are generated,
  wherein a data area is arranged within a horizontal blanking area for each horizontal line of video data in a data stream, wherein the two packet streams are multiplexed based on the audio,
  wherein the two packet streams are obtained by the sampling operation on the audio at an average number of times of the sampling operation on the audio per one horizontal line of the video data of a frame rate,
  wherein the average number of times of the sampling operation on the audio is in a range of 0.36 to 1, and
  wherein the frame rate is in a range of 96 Hz to 120 Hz.

13. A non-transitory computer-readable medium having stored thereon computer-executable instructions that, when executed by a processor, cause a computer to execute operations, the operations comprising:
generating an audio sample based on a sampling operation on an audio; and
multiplexing two packet streams into a first data area of horizontal lines of at least two rows,
  wherein the first data area of horizontal lines of at least two rows are subsequent to a second data area of a first horizontal line in which the two packet streams are generated,
  wherein a data area is arranged within a horizontal blanking area for each horizontal line of video data in a data stream,
  wherein the two packet streams are multiplexed based on the audio,
  wherein the two packet streams are obtained by the sampling operation on the audio at an average number of times of the sampling operation on the audio per one horizontal line of the video data of a frame rate,
  wherein the average number of times of the sampling operation on the audio is in a range of 0.36 to 1, and
  wherein the frame rate is in a range of 96 Hz to 120 Hz.

14. A signal processing apparatus, comprising:
a memory that stores instructions; and
at least one processor coupled with the memory, the at least processor:
  extracts two packet streams from a data stream in which the two packet streams are multiplexed into a first data area of horizontal lines of at least two rows,
    wherein the first data area of horizontal lines of at least two rows are subsequent to a second data area of a first horizontal line in which the two packet streams are extracted,
    wherein a data area is arranged within a horizontal blanking area for each horizontal line of video data in the data stream,
    wherein the two packet streams are multiplexed based on an audio,
    wherein the two packet streams are obtained by a sample operation on the audio at an average number of times of the sample operation on the audio per one horizontal line of the video data of a frame rate,
    wherein the average number of times of the sample operation on the audio is in a range of 0.36 to 1, and
    wherein the frame rate is in a range of 96 Hz to 120 Hz; and
  restores an audio stream that includes the extracted two packet streams.

15. A signal processing method, comprising:
extracting, by a processor, two packet streams from a data stream in which the two packet streams are multiplexed into a first data area of horizontal lines of at least two rows,
  wherein the first data area of horizontal lines of at least two rows are subsequent to a second data area of a first horizontal line in which the two packet streams are extracted,
  wherein a data area is arranged within a horizontal blanking area for each horizontal line of video data in the data stream,
  wherein the two packet streams are multiplexed based on an audio,
  wherein the two packet streams are obtained by a sampling operation on the audio at an average number of times of the sampling operation on the audio per one horizontal line of the video data of a frame rate,
  wherein the average number of times of the sampling operation on the audio is in a range of 0.36 to 1, and
  wherein the frame rate is in a range of 96 Hz to 120 Hz; and
restoring, by the processor, an audio stream that includes the extracted two packet streams.

16. A non-transitory computer-readable medium having stored thereon computer-executable instructions that, when executed by a processor, cause a computer to execute operations, the operations comprising:
extracting two packet streams from a data stream in which the two packet streams are multiplexed into a first data area of horizontal lines of at least two rows, wherein the first data area of horizontal lines of at least two rows are subsequent to a second data area of a first horizontal line in which the two packet streams are extracted,
wherein a data area is arranged within a horizontal blanking area for each horizontal line of video data in the data stream,
wherein the two packet streams are multiplexed based on an audio,
wherein the two packet streams are obtained by a sampling operation on the audio at an average number of times of the sampling operation on the audio per one horizontal line of the video data of a frame rate,
wherein the average number of times of the sampling operation on the audio is in a range of 0.36 to 1, and
wherein the frame rate is in a range of 96 Hz to 120 Hz; and
restoring an audio stream that includes the extracted two packet streams.

17. A signal transmission system, comprising:
a signal transmission apparatus including:
  a first memory that stores instructions; and
  at least one first processor coupled to the first memory, wherein the at least one first processor:
    generates an audio sample based on a sample operation on an audio;
    multiplexes two packet streams into a first data area of horizontal lines of at least two rows,
      wherein the first data area of horizontal lines of at least two rows are subsequent to a second data area of a first horizontal line in which the two packet streams are generated,
      wherein a data area is arranged within a horizontal blanking area for each horizontal line of video data in a data stream, and
      wherein the two packet streams are multiplexed based on the audio, and
      wherein the two packet streams are obtained by the sample operation on the audio at an average number of times of the sample operation on the audio per one horizontal line of the video data of a frame rate,
      wherein the average number of times of the sample operation on the audio is in a range of 0.36 to 1, and
      wherein the frame rate is in a range of 96 Hz to 120 Hz; and
    controls transmission of the data stream into which the two packet streams are multiplexed; and
a signal reception apparatus including:
  a second memory that stores instructions; and
  at least one second processor coupled with the second memory, wherein the at least one second processor:
    controls reception of the data stream;
    extracts the two packet streams from the data stream; and
    restores an audio stream that includes the extracted two packet streams.

* * * * *